May 21, 1929.　　　A. L. NELSON　　　1,713,778
POSITIONING FIXTURE
Original Filed June 22, 1925　　2 Sheets-Sheet 2
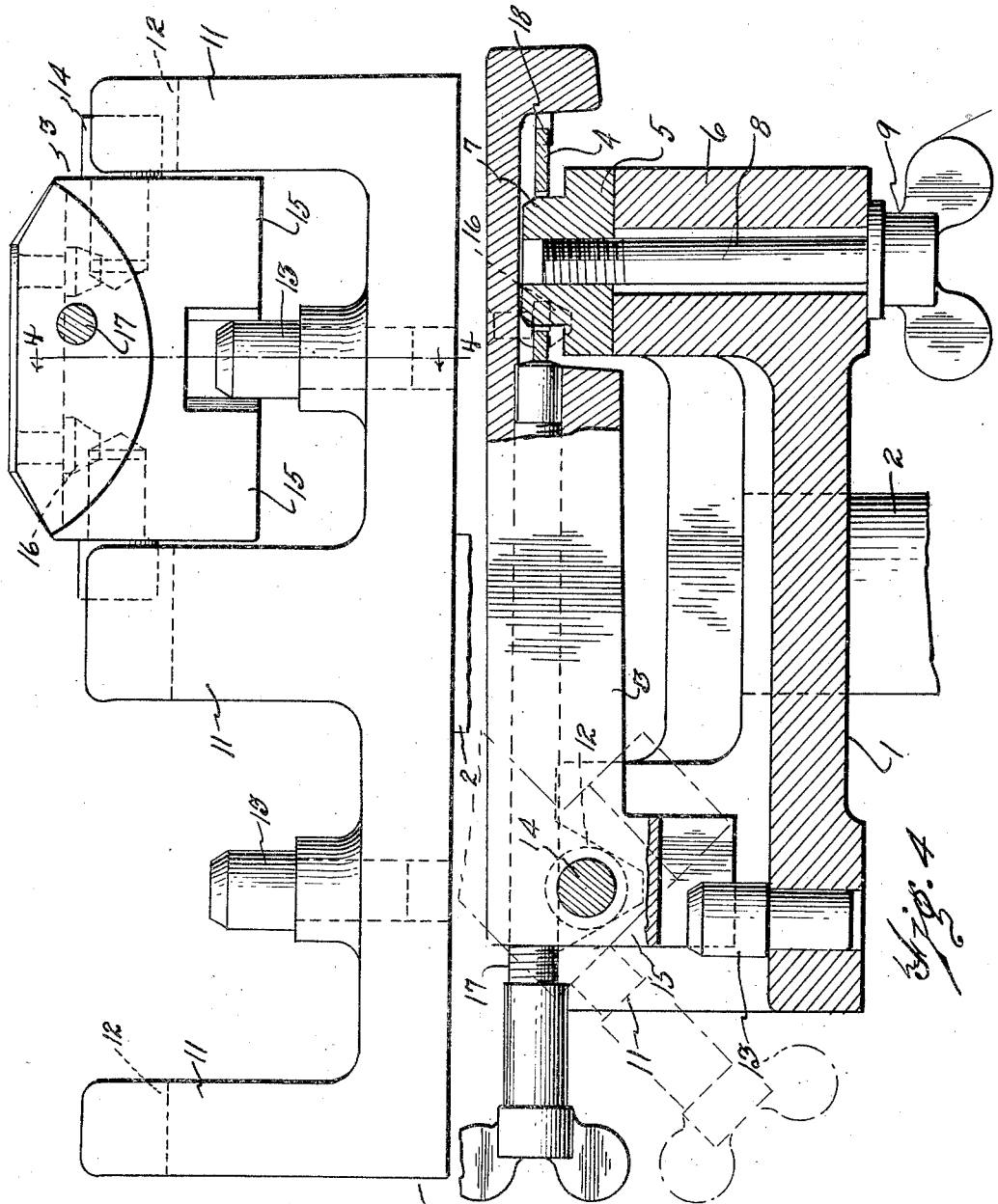
INVENTOR.
ADOLPH L. NELSON
BY
ATTORNEYS Patented May 21, 1929.

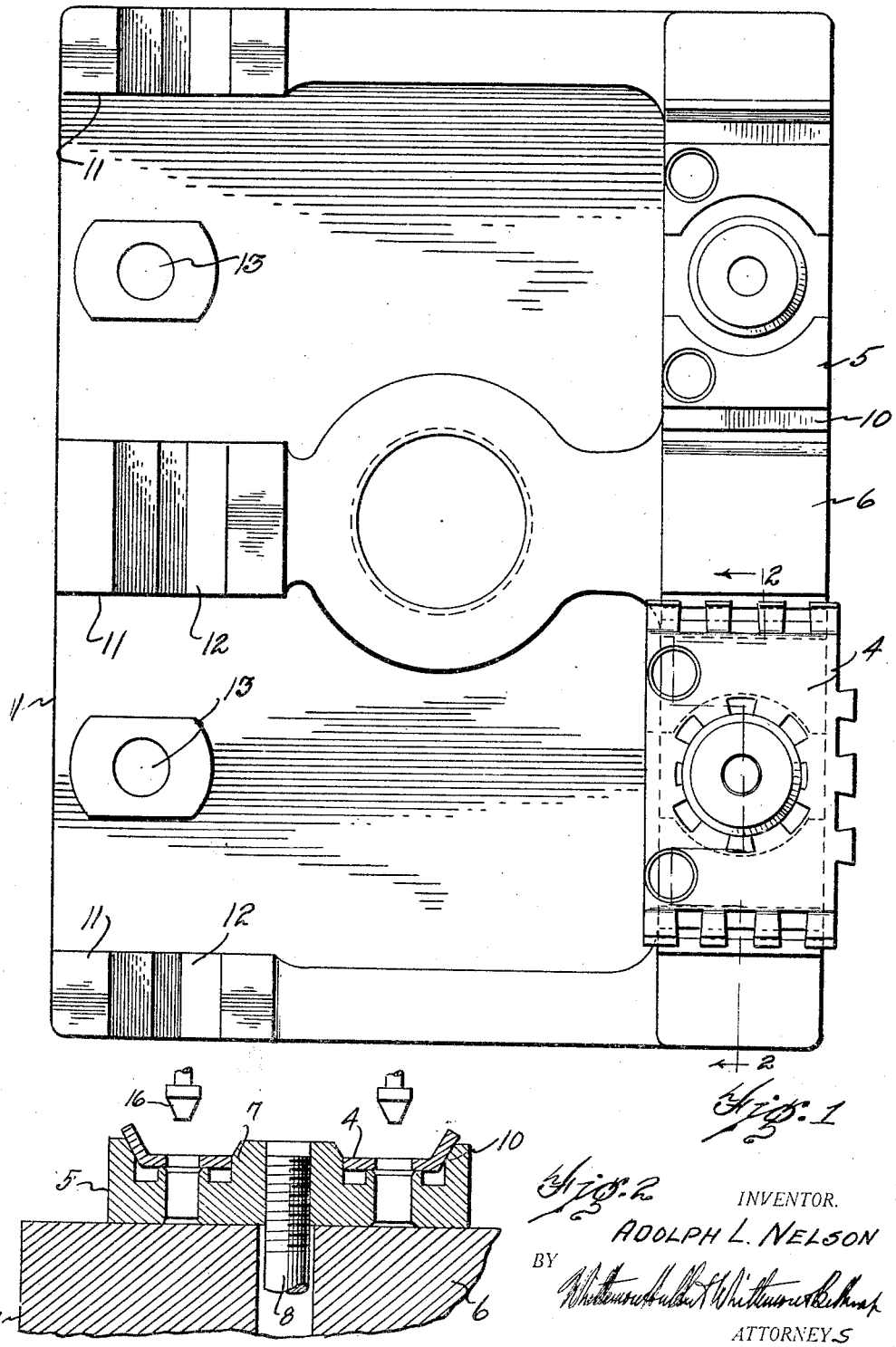

1,713,778

UNITED STATES PATENT OFFICE.

ADOLPH L. NELSON, OF DETROIT, MICHIGAN, ASSIGNOR TO BOHN ALUMINUM & BRASS CORPORATION, OF DETROIT, MICHIGAN.

POSITIONING FIXTURE.

Application filed June 22, 1925, Serial No. 38,914. Renewed December 2, 1927.

The invention relates to a fixture for positioning a work member in a predetermined relation to the fixture and is particularly applicable to a fixture for positioning a pair of work members in operative relation to each other. One of the objects of the invention is to provide for the positioning of a work member successively in transverse directions to thereby facilitate the positioning of the work member. Another object is to provide for successively positioning the work member during its rocking movement in transverse directions. A further object is to provide for positioning a pair of work members independently of each other so that they will assume an operative relation to each other at the end of the positioning operations. With these as well as other objects in view the invention resides in the novel features of construction as more fully hereinafter set forth.

In the drawings:—

Figure 1 is a plan view of a fixture embodying my invention and showing one of the work members thereon;

Figure 2 is a cross section on the line 2—2 of Figure 1;

Figure 3 is an end view of the fixture and showing the other of the work members in position thereon;

Figure 4 is a cross section on the line 4—4 of Figure 3.

1 is the base of the positioning fixture which as shown in the present instance is supported by means of the upright 2 threaded centrally thereinto. The work members in the present instance comprise the side core section 3 and the strut 4, the former being insertable into a mold to form a part of the core therefor and the latter being positioned in the mold by the former and arranged to be cast into the casting formed in the mold. In the present instance a pair of each of the side core sections and the struts are used in a single mold and the positioning fixture is constructed to position both pairs so that each side core section may be positioned in operative relation to a strut. Since the arrangement is the same at each side of the transverse center line of the fixture but one side will be described.

For positioning the strut 4 I have provided the block 5 which is secured upon the upright flange 6 at one end of the fixture base 1. This block has the upwardly extending cylindrical boss 7 preferably having a beveled upper corner and being internally threaded to receive the stud 8 which extends up through the flange 6 and has threaded on its lower end the thumb nut 9. Clearance is provided around the stud 8 so that the latter may be laterally adjusted with the block 5 to properly position the strut 4, the thumb nut being used to clamp the block and stud in adjusted position. The block 5 has at its opposite ends the upwardly extending flanges 10 having beveled inner corners, the arrangement being such that the strut 4, which is provided with a central aperture and has upwardly diverging end tongues, will rest upon and be positioned by the block.

For the purpose of readily positioning the side core section 3 upon the fixture and in operative relation to the strut 4 the fixture has at the end opposite to the flange 6 the upwardly extending spaced projections or bifurcations 11, which have in their upper edges the aligned V-shaped notches 12. The fixture also has extending upwardly from its base and between the projections or bifurcations 11 the pin 13 which preferably has a beveled upper corner. The width of the side core section 3 is preferably less than the distance between the bifurcations or projections of the fixture and this side core section is provided with the aligned laterally extending gudgeons 14, which are engageable with the V-shaped notches 12 to thereby position the side core section longitudinally relative to the fixture. The side core section is also provided with the depending bifurcations 15 preferably having their adjacent walls diverging rearwardly and engageable on opposite sides of the pin 13 to thereby position the side core section laterally relative to the fixture. In positioning the side core section upon the fixture and in operative relation to the strut this side core section is first placed in the position indicated by the dotted lines in Figure 4 and then rocked or swung about its gudgeons so that the positioning of the side core section both longitudinally and laterally is separately and successively accomplished thus materially facilitating the positioning operation.

For assuring the position of the strut in operative relation to the side core section the latter is provided with the tapered pins 16 which are engageable in small holes on opposite sides of the transverse center line of the strut.

After the side core section has been operatively positioned relative to its strut with the two in engagement with each other the two are then secured to each other by suitable means, which in the present instance is the screw 17 extending longitudinally within the core section and threadedly engaging the same and having an end engageable with a side edge of the strut to clamp the opposite side edge against an adjacent shoulder 18 upon the side core section. The side core section and strut then may be removed from the fixture in their assembled relation and the fixture is then ready to again position another pair of work members in operative relation.

It will be noted that the center upwardly extending projection 11 has a width sufficient to accommodate the adjacent gudgeons 14 upon the two side core sections which are being positioned by the one fixture.

What I claim as my invention is:

1. The combination with a positioning fixture, of a work member rockably supported upon said fixture, and cooperating means upon said fixture and work member operable during the rocking of said work member to successively position said work member in transverse directions relative to said fixture.

2. The combination with a work member, of a positioning fixture therefor having spaced notched projections, aligned projections upon said work member respectively engageable in the notches of said spaced projections for positioning said work member in one direction relative to said fixture, and other projections upon said fixture and work member for positioning said work member relative to said fixture in a transverse direction.

3. The combination with a work member, of a positioning fixture therefor having bifurcations with V-shaped notches in their upper edges, pins upon said work member engageable in the notches for positioning said work member in one direction relative to said fixture, a projection upon said fixture between said bifurcations and bifurcations upon said work member engageable with said projection for positioning said work member relative to said fixture in a transverse direction.

4. The combination with a pair of work members, of a positioning fixture therefor, and means upon said fixture and work members for positioning said work members in operative relation to each other.

5. The combination with a pair of work members, of a positioning fixture therefor, means upon said fixture and one of said work members for positioning the latter relative to the former, and means upon said fixture and the other of said work members for successively positioning said other work member in transverse directions relative to said fixture to bring the same into operative relation with the first mentioned work member.

6. The combination with a positioning fixture, of a work member positioned upon said fixture, a second work member rockably supported upon said fixture, and cooperating means upon said fixture and second work member operable during the rocking of said second work member to successively position said work member in transverse directions relative to said fixture to bring the same into operative relation to said first mentioned work member.

7. The combination with a positioning fixture, of a work member positioned upon said fixture, a second work member rockably supported upon said fixture, cooperating means upon said fixture and second work member operable during the rocking of said second work member to successively position said work member in transverse directions relative to said fixture to bring the same into operative relation to said first mentioned work member, and means upon one of said work members for securing the other of said work members thereto in operative relation.

8. The combination with a positoning fixture, of a pair of work members, an adjustable member upon said fixture for positioning one of said work members upon said fixture, means upon said fixture and the other of said work members for positioning the other of said work members in transverse directions relative to said fixture to bring the same into operative relation with the first mentioned work member and means for securing said work members to each other while positioned by said fixture.

9. The combination with a positioning fixture, of a work member supported upon and positioned by said fixture, a second work member supported upon and positioned in transverse directions by said fixture, and means upon one of said work members engageable with the other to accurately position said work members relative to each other.

10. The method of positioning one member relative to another which includes positioning one member separately and in transverse directions relative to the other member and bringing the two into operative relation to each other.

11. The method of positioning one member relative to the other, which includes rocking one member relative to the other and successively positioning the one member in transverse directions to bring the same into operative relation to the other.

12. The method of assembling a pair of work members, which includes positioning one of the work members separately in transverse directions relative to the other and bringing the same into operative relation to each other and then clamping these work members together.

13. In a device of the class described, a positioning fixture, a pair of work members, means for supporting one work member and means on said fixture engaging the other work member for universally aligning it with said first work member.

14. In a device of the class described, a pair of work members, a positioning fixture and cooperating parts on said members and fixture engageable to universally align said work members.

15. In combination, a strut, a support member, means for positioning the strut relative to the support member, a work member, and means for positioning the work member relative to the strut.

16. In combination, a strut, a support member, means for positioning the strut relative to the support member, a work member, means for positioning the work member relative to the strut, and means carried by the work member for gripping the strut.

In testimony whereof I affix my signature.

ADOLPH L. NELSON.